US011200760B2

(12) United States Patent
Brown et al.

(10) Patent No.: US 11,200,760 B2
(45) Date of Patent: Dec. 14, 2021

(54) SYSTEMS AND METHODS FOR MEASURING FLEETS OF SELF-DRIVING INDUSTRIAL VEHICLES

(71) Applicant: Clearpath Robotics Inc., Kitchener (CA)

(72) Inventors: David Andrew Brown, Kitchener (CA); Anthony William Tod, Kitchener (CA); Guillaume Autran, Kitchener (CA); Roydyn Clayton, Seattle, WA (US); Ryan Christopher Gariepy, Kitchener (CA)

(73) Assignee: CLEARPATH ROBOTICS INC., Kitchener (CA)

( * ) Notice: Subject to any disclaimer, the term of this patent is extended or adjusted under 35 U.S.C. 154(b) by 205 days.

(21) Appl. No.: 16/253,305

(22) Filed: Jan. 22, 2019

(65) Prior Publication Data
US 2019/0228597 A1    Jul. 25, 2019

Related U.S. Application Data

(60) Provisional application No. 62/620,184, filed on Jan. 22, 2018.

(51) Int. Cl.
*G07C 5/00* (2006.01)
*G05D 1/00* (2006.01)
(Continued)

(52) U.S. Cl.
CPC ......... *G07C 5/008* (2013.01); *G05D 1/0088* (2013.01); *G05D 1/0291* (2013.01); *G07C 5/085* (2013.01); *G07C 5/0808* (2013.01)

(58) Field of Classification Search
CPC ...... G07C 5/008; G07C 5/085; G07C 5/0808; G05D 1/0291; G05D 1/0088
See application file for complete search history.

(56) References Cited

U.S. PATENT DOCUMENTS

| 5,199,524 A | 4/1993 | Ivancic |
| 6,668,318 B1 | 12/2003 | Jenkins et al. |

(Continued)

FOREIGN PATENT DOCUMENTS

| WO | 2013096651 A1 | 6/2013 |
| WO | 2017072771 A1 | 5/2017 |

OTHER PUBLICATIONS

Eric Park, Linda Kobayashi and Susan Lee: "Extensible Hardware Architecture for Mobile Robots" Intelligent Robotics Group Apr. 18, 2005.
(Continued)

*Primary Examiner* — Mathew Franklin Gordon
(74) *Attorney, Agent, or Firm* — Bereskin & Parr LLP/S.E.N.C.R.L., s.r.l.

(57) ABSTRACT

Systems and methods for measuring a fleet of self-driving vehicles are disclosed. The system comprises one or more self-driving vehicles, non-transitory computer-readable media in communication with the vehicles, a fleet-management system in communication with the media and vehicles, and a server in communication with the media. The fleet-management system is configured to store vehicle status records comprising a vehicle status pertaining to each of the one or more vehicles, and a timestamp in a vehicle status log on the media. The server has a processor that is configured to generate a fleet-performance report based on the vehicle status log.

18 Claims, 9 Drawing Sheets

(51) Int. Cl.
*G05D 1/02* (2020.01)
*G07C 5/08* (2006.01)

(56) References Cited

U.S. PATENT DOCUMENTS

| | | | |
|---|---|---|---|
| 7,409,356 B1 | 8/2008 | Geddes | |
| 7,532,962 B1 | 5/2009 | Lowrey et al. | |
| 7,734,389 B2 | 6/2010 | Shin | |
| 7,826,919 B2 | 11/2010 | D'Andrea et al. | |
| 7,894,932 B2 | 2/2011 | Mountz et al. | |
| 7,894,933 B2 | 2/2011 | Mountz et al. | |
| 7,912,574 B2 | 3/2011 | Wurman et al. | |
| 8,190,322 B2 | 5/2012 | Lin et al. | |
| 8,220,710 B2 | 7/2012 | Hoffman et al. | |
| 8,457,808 B2 | 6/2013 | Michnik et al. | |
| 8,502,498 B2 | 8/2013 | Fecher | |
| 8,660,740 B2 | 2/2014 | Koniditsiotis et al. | |
| 8,761,989 B1 | 6/2014 | Murphy | |
| 8,914,182 B2 | 12/2014 | Casado | |
| 9,315,178 B1 | 4/2016 | Ferguson et al. | |
| 9,606,544 B2 | 3/2017 | Gariepy et al. | |
| 9,766,671 B2 | 9/2017 | Dorn et al. | |
| 10,055,903 B2 | 8/2018 | Koons et al. | |
| 10,109,120 B2 | 10/2018 | Boss et al. | |
| 10,423,934 B1 | 9/2019 | Zanghi et al. | |
| 10,565,807 B2 | 2/2020 | Boss et al. | |
| 10,717,448 B1 | 7/2020 | Seo | |
| 10,726,644 B2 | 7/2020 | Abari et al. | |
| 10,867,455 B2 | 12/2020 | Segal et al. | |
| 2004/0158355 A1 | 8/2004 | Holmqvist et al. | |
| 2007/0129847 A1 | 6/2007 | Ulmer et al. | |
| 2008/0009965 A1 | 1/2008 | Bruemmer et al. | |
| 2008/0009966 A1 | 1/2008 | Bruemmer et al. | |
| 2008/0028237 A1 | 1/2008 | Knight | |
| 2008/0262669 A1 | 10/2008 | Smid et al. | |
| 2008/0291879 A1 | 11/2008 | Duff et al. | |
| 2009/0074545 A1 | 3/2009 | Lert, Jr. et al. | |
| 2009/0077808 A1 | 3/2009 | Malm | |
| 2009/0160255 A1 | 6/2009 | Grady | |
| 2009/0304101 A1 | 12/2009 | LoPorto et al. | |
| 2010/0060604 A1 | 3/2010 | Zwart et al. | |
| 2011/0031929 A1 | 2/2011 | Asada et al. | |
| 2011/0144823 A1 | 6/2011 | Muller et al. | |
| 2012/0019205 A1 | 1/2012 | Kressner et al. | |
| 2012/0101627 A1 | 4/2012 | Lert | |
| 2012/0179337 A1 | 7/2012 | Doan | |
| 2012/0239224 A1 | 9/2012 | McCabe et al. | |
| 2013/0000438 A1 | 1/2013 | Ouellet | |
| 2013/0006677 A1 | 1/2013 | Anglin et al. | |
| 2013/0035823 A1 | 2/2013 | Yoshida | |
| 2013/0179057 A1 | 7/2013 | Fisher et al. | |
| 2013/0248547 A1 | 9/2013 | Braun et al. | |
| 2014/0074345 A1 | 3/2014 | Gabay et al. | |
| 2014/0142785 A1 | 5/2014 | Fuentes et al. | |
| 2014/0244097 A1 | 8/2014 | Colwell | |
| 2014/0303768 A1 | 10/2014 | Klumpp et al. | |
| 2014/0303814 A1 | 10/2014 | Burema et al. | |
| 2014/0308098 A1 | 10/2014 | Lert et al. | |
| 2014/0344118 A1 | 11/2014 | Parpia et al. | |
| 2014/0350725 A1 | 11/2014 | LaFary et al. | |
| 2014/0360832 A1 | 12/2014 | Aldrich | |
| 2014/0365258 A1* | 12/2014 | Vestal | G06Q 10/063114 705/7.15 |
| 2014/0379205 A1 | 12/2014 | Muetzel et al. | |
| 2015/0006005 A1 | 1/2015 | Yu et al. | |
| 2015/0091507 A1 | 4/2015 | Hyde et al. | |
| 2015/0100504 A1 | 4/2015 | Binion et al. | |
| 2015/0148951 A1 | 5/2015 | Jeon et al. | |
| 2015/0161830 A1 | 6/2015 | Lenhardt et al. | |
| 2015/0224891 A1 | 8/2015 | Petrosian et al. | |
| 2015/0339928 A1 | 11/2015 | Ramanujam | |
| 2015/0360865 A1 | 12/2015 | Massey | |
| 2016/0063435 A1 | 3/2016 | Shah et al. | |
| 2016/0093119 A1 | 3/2016 | Ahn et al. | |
| 2016/0121487 A1 | 5/2016 | Mohan et al. | |
| 2016/0236867 A1 | 8/2016 | Brazeau et al. | |
| 2016/0342915 A1* | 11/2016 | Humphrey | G05D 1/0297 |
| 2017/0092131 A1 | 3/2017 | Fairfield et al. | |
| 2017/0123421 A1 | 5/2017 | Kentley et al. | |
| 2017/0205833 A1 | 7/2017 | Gariepy et al. | |
| 2017/0263120 A1 | 9/2017 | Durie, Jr. et al. | |
| 2017/0300054 A1 | 10/2017 | Hanson et al. | |
| 2018/0013211 A1 | 1/2018 | Ricci | |
| 2018/0143649 A1 | 5/2018 | Miao et al. | |
| 2018/0164825 A1 | 6/2018 | Matus et al. | |
| 2018/0204458 A1 | 7/2018 | Fairfield et al. | |
| 2018/0247207 A1 | 8/2018 | Ristovski et al. | |
| 2018/0313282 A1 | 11/2018 | Pati et al. | |
| 2019/0012198 A1 | 1/2019 | Ni et al. | |
| 2019/0196480 A1* | 6/2019 | Taylor | G05D 1/0088 |
| 2019/0220011 A1 | 7/2019 | Della Penna | |
| 2020/0143610 A1 | 5/2020 | Boss et al. | |
| 2020/0167722 A1 | 5/2020 | Goldberg | |
| 2020/0174493 A1 | 6/2020 | Lin et al. | |
| 2020/0294401 A1 | 9/2020 | Kerecsen | |
| 2020/0361480 A1 | 11/2020 | Rodriguez Bravo et al. | |
| 2021/0012592 A1 | 1/2021 | Abari et al. | |
| 2021/0064057 A1 | 3/2021 | Eldar et al. | |

OTHER PUBLICATIONS

International Preliminary Report on Patentability of the ISA, dated Aug. 6, 2020 re PCT International Application No. PCT/CA2019/050076. (7 pages).

* cited by examiner

SYSTEMS AND METHODS FOR MEASURING FLEETS OF SELF-DRIVING INDUSTRIAL VEHICLES

CROSS-REFERENCE TO RELATED APPLICATIONS

This application claims priority to U.S. Provisional Patent Application No. 62/620,184, filed 22 Jan. 2018, and titled "SYSTEMS AND METHODS FOR MEASURING FLEETS OF SELF-DRIVING INDUSTRIAL VEHICLES", the contents of which are incorporated herein by reference for all purposes.

TECHNICAL FIELD

The described embodiments relate to fleets of self-driving industrial vehicles, and in particular, to systems and methods for measuring fleets of self-driving industrial vehicles.

BACKGROUND

The following paragraphs are not an admission that anything discussed in them is prior art or part of the knowledge of persons skilled in the art.

Materials have traditionally been transported within industrial facilities manually by human labor or using human-operated vehicles such as fork lifts and pallet jacks. More recently, automated guided vehicles ("AGVs") have been used to transport materials within industrial facilities with reduced human involvement as compared to traditional methods.

When fleets of human-operated vehicles and AGVs are deployed within an industrial facility, a general overall increase in productivity may be observed. For example, the number of finished goods produced in a facility using AGVs may be compared to the number of finished goods produced in a facility that does not use AGVs.

While general overall increases in productivity may be observed and measured by using one type of traditional material-transport vehicles as compared to another type of traditional material-transport vehicles, detailed observations and measurements of how a particular fleet of material-transport vehicles is being utilized remain unattainable. For example, such observations and measurements would require human observers that would be costlier to employ than the vehicles themselves.

There remains a need for detailed performance-metric analysis and reporting for industrial vehicles, other industrial equipment, and self-driving vehicles.

SUMMARY

In a first aspect, there is a method for measuring a fleet of self-driving vehicles. The method comprises transmitting instructions pertaining to an operation of a self-driving vehicle using a fleet management system. The vehicle is autonomously operated according to the instructions. A vehicle status is generated based on operating the vehicle. The vehicle status is recorded with an associated time as a vehicle status record in a vehicle status log on non-transient computer-readable media. A request for a report is received, and, in response, a fleet-performance report is generated based on the vehicle status log.

According to some embodiments, a reporting period and a reporting vehicle status are determined based on the report request. An incidents duration is determined based on a set of vehicle status records associated with the reporting vehicle status within the vehicle status log. Generating the fleet performance report based on the vehicle status log comprises generating the fleet performance report based on the incidents duration.

According to some embodiments, the method further comprises determining an incidents count based on the set of vehicle status records Generating the fleet performance report based on the incidents duration comprises generating the fleet performance report based on the incidents duration and the incidents count.

According to some embodiments, the method further comprises determining a second reporting vehicle status based on the report request, and determining a second incidents duration based on a second set of vehicle status records associated with the second reporting vehicle status within the vehicle status log. Generating the fleet performance report based on the vehicle status log comprises generating the fleet performance report based on the incidents duration and the second incidents duration.

According to some embodiments, the method further comprises determining a second reporting vehicle status based on the report request and determining an incidents count based on the second set of vehicle status records associated with the second reporting vehicle status within the vehicle status log. Generating the fleet performance report based on the vehicle status log comprises generating the fleet performance report based on the incidents duration and the incidents count.

In a second aspect, there is a system for measuring a fleet of self-driving vehicles. The system comprises one or more self-driving vehicles that are members of the fleet, non-transitory computer-readable media, a fleet-management system, and a server. The media are in communication with the vehicles, the fleet-management system and the server. The fleet-management system is in communication with the vehicles. The fleet-management system is configured to store one or more vehicle status records, each comprising a vehicle status pertaining to each of the one or more vehicles and a timestamp, in a vehicle status log on the media. The server has a processor configured to generate a fleet performance report based on the vehicle status log.

According to some embodiments, there are a first and second fleet of one or more vehicles each, first and second media, first and second vehicle status logs, first and second fleet-management systems, and first and second fleet performance reports. The first and second media are in communication with the first and second one or more vehicles, respectively, and the first and second fleet-management systems respectively. The first and second fleet-management systems are in communication with the first and second one or more vehicles respectively, and are configured to store one or more vehicle statuses pertaining to each of the first and second one or more vehicles respectively in the first and second vehicles status logs, respectively, on the first and second media, respectively. First and second terminals are each in communication with the server. The first and second media are in communication with the server. The processor is further configured to receive a first report request from the first terminal and a second report request from the second terminal. Generating the fleet performance report comprises generating the first fleet performance report based on the first vehicle status log in response to the first report request, and generating a second fleet performance report based on the second vehicle status log in response to the second report request.

According to some embodiments, the processor configured to generate the fleet performance report comprises the processor configured to determine a reporting period based on the report request, determine a reporting vehicle status based on the report request, determine an incidents duration based on a set of vehicle status records associated with the reporting vehicle status within the vehicle status log, and generate the fleet performance report based on the incidents duration.

According to some embodiments, the processor configured to generate the fleet performance report further comprises the processor configured to determine an incidents count based on the set of vehicle status reports. The processor configured to generate the fleet performance report based on the incidents duration comprises the processor configured to generate the fleet performance report based on the first incidents duration and the incidents count.

According to some embodiments, the processor configured to generate the fleet performance report further comprises the processor configured to determine a second reporting vehicle status based on the report request and determine an incidents count based on a second set of vehicle status records associated with the second reporting vehicle status within the vehicle status log. The processor configured to generate the fleet performance report based on the incidents duration comprises the processor configured to generate the fleet performance report based on the incidents duration and the incidents count.

According to some embodiments, the reporting vehicle status is an active vehicle status and the second reporting vehicle status is an inactive vehicle status.

According to some embodiments, the processor configured to generate the fleet performance report based on the incidents duration and the incidents count comprises a mean-time calculation.

According to some embodiments, the processor configured to generate the fleet performance report further comprises the processor configured to determine a second reporting vehicle status based on the report request, and determine a second incidents duration based on the second set of vehicle status records associated with the second reporting vehicle status within the vehicle status log. The processor configured to generate the fleet performance report based on the incidents duration comprises the processor configured to generate the fleet performance report based on the incidents duration and the second incidents duration.

According to some embodiments, the processor configured to generate the fleet performance report comprises the processor configured to determine a reporting period based on the report request, determine a reporting vehicle status based on the report request, and determine an incidents count based on a set of vehicles status records associated with the reporting vehicle status within the vehicle status log.

According to some embodiments, the processor configured to generate the fleet performance report further comprises the processor configured to determine a second reporting vehicle status based on the report request, and determine an incidents duration based on a second set of vehicle status records associated with the second reporting vehicle status within the vehicle status log. The processor configured to generate the fleet performance report based on the incidents count comprises the processor configured to generate the fleet performance report based on the incidents count and the incidents duration.

According to some embodiments, the processor configured to generate the fleet performance report further comprises the processor configured to determine a second reporting vehicle status based on the report request and determine a second incidents count based on a second set of vehicle status records associated with the second reporting vehicle status within the vehicle status log. The processor configured to generate the fleet performance report based on the incidents count comprises the processor configured to generate the fleet performance report based on the incidents count and the second incidents count.

According to some embodiments, the fleet management system comprises the server.

In a third aspect, there are non-transitory computer-readable media comprising one or more instructions for measuring a fleet of self-driving vehicles that, when executed on a processor, configure the processor: to transmit instructions pertaining to an operation of a self-driving vehicle, the instructions being associated with an autonomous operation of the self-driving vehicle; record a vehicle status based on the autonomous operation of the vehicle in a vehicle status log; record a time associated with the vehicle status in the vehicle status log; receive a report request; and generate a report based on the vehicle status log in response to the report request.

BRIEF DESCRIPTION OF THE DRAWINGS

Several embodiments will now be described in detail with reference to the drawings, in which.

Figure 1:
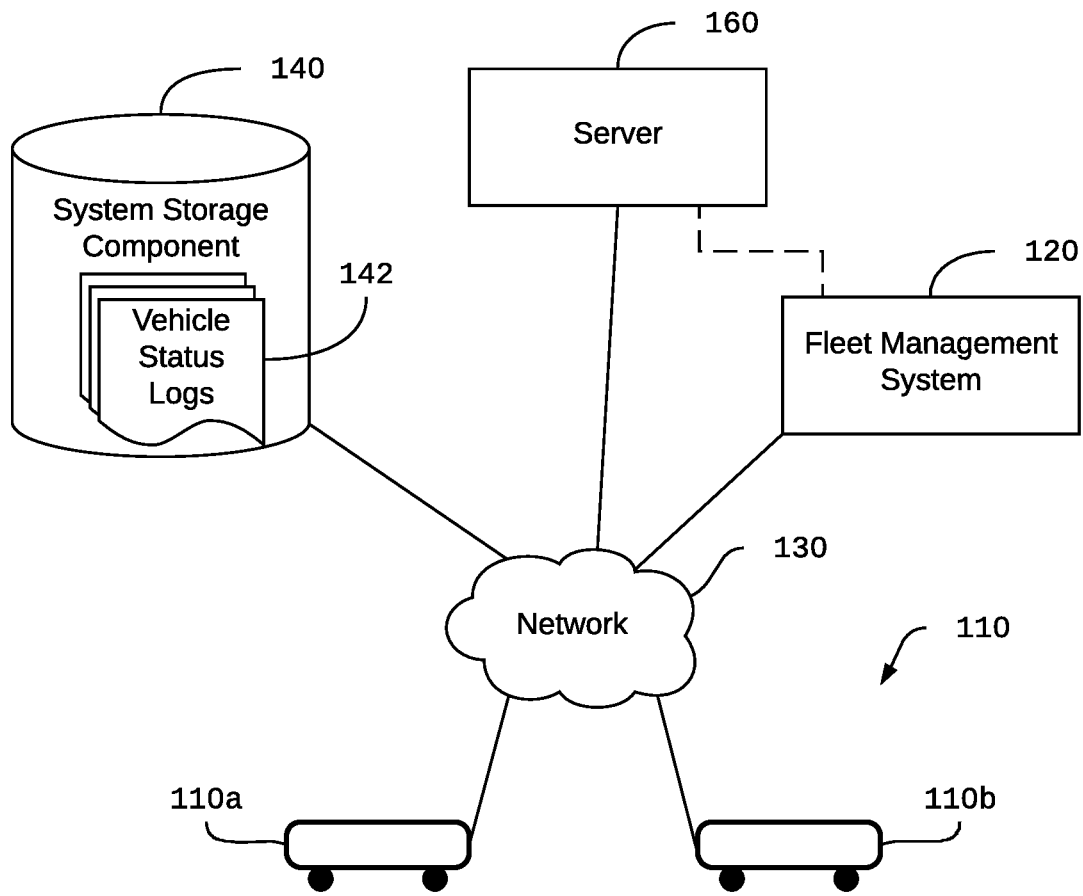
FIG. 1 is a system diagram of a system of one or more self-driving vehicles, according to at least one embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Self-driving industrial vehicles and systems can be used not only to transport materials without constant direct human operation, but also to monitor themselves and their performance, thereby providing deeper insights into vehicle status, vehicle performance, fleet status, and fleet performance as compared to traditional material-transport vehicles.

Referring to FIG. 1, there is shown a system 100 of one or more self-driving industrial vehicles 110, according to at least one embodiment. The system 100 can include one or more self-driving industrial vehicles 110, a fleet-management system 120, a network 130, a system storage component 140, and a server 160. While FIG. 1 shows the system 100 having two self-driving industrial vehicles 110a and 110b for illustrative purposes. The system 100 can include one or more self-driving industrial vehicles 110.

According to some embodiments, a fleet-management system 120 may be used to provide a mission to a self-driving industrial vehicle 110. The fleet-management system 120 has a processor, memory, and a communication interface (not shown) for communicating with the network 130. The fleet-management system 120 uses the memory to store computer programs that are executable by the processor (e.g. using the memory) so that the fleet-management system 120 can communicate information with other systems, and communicate with one or more self-driving industrial vehicles 110. In some embodiments, the fleet-management system 120 can also generate missions for the self-driving industrial vehicles 110.

Any or all of the self-driving industrial vehicles 110 and the fleet-management system 120 may communicate with the network 130 using known telecommunications protocols and methods. For example, each self-driving industrial vehicle 110 and the fleet-management system 120 may be equipped with a wireless communication interface to enable wireless communications within a LAN according to a WiFi protocol (e.g. IEEE 802.11 protocol or similar), or via a WWAN according to a 3G/4G protocol.

According to some embodiments, the system storage component 140 can store information about the self-driving industrial vehicles 110 as well as electronic maps of the facilities within which the self-driving industrial vehicles 110 operate. The information about the self-driving industrial vehicles 110 may generally be stored within vehicle status logs 142 on the system storage component 140, as further described below.

The server 160 may be in communication with the fleet-management system 120 via the network 130, or the server may 160 may be a part of or implemented on the same computer system as the fleet-management system 120 as indicated by the dashed line. Generally, the server can be used to provide reports of vehicle status, vehicle performance, fleet status, and fleet performance based on the vehicle status logs 142, and/or to record vehicle status records in the vehicle status logs 142 based on status updates from the vehicles 110. The server 160 has a processor, memory, and a communication interface (not shown) for communicating with the network 130. The server 160 uses the memory to store computer programs that are executable by the processor (e.g. using the memory) so that the server 160 can communicate information with other systems, such as the fleet-management system 120 and/or the vehicles 110.

Figure 2:
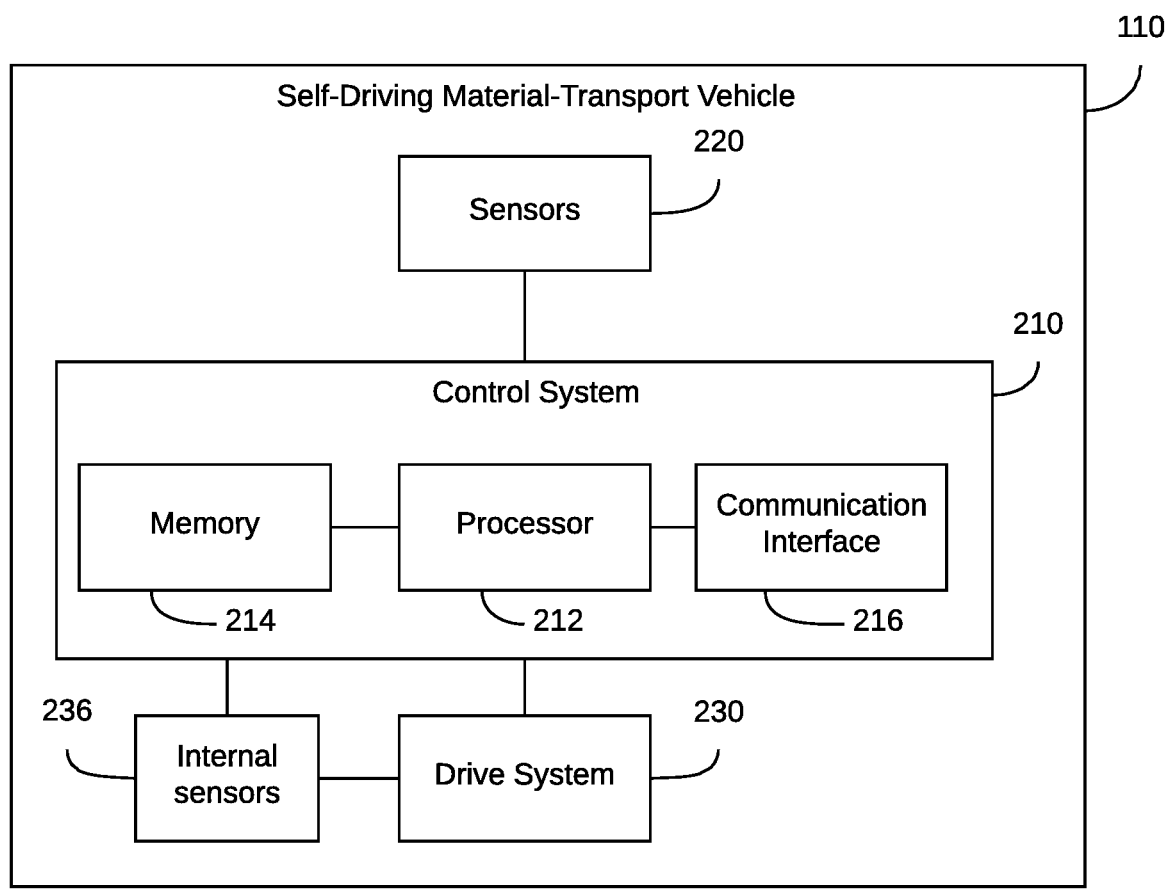
FIG. 2 is a block diagram of the self-driving vehicle shown in FIG. 1, according to at least one embodiment.

Referring to FIG. 2, there is shown a block diagram of a self-driving industrial vehicle 110, according to at least one embodiment. The self-driving industrial vehicle 110 generally includes a control system 210 and a drive system 230.

The control system 210 can include a processor 212, memory 214, communication interface 216, and one or more sensors 220. The control system 210 enables the self-driving industrial vehicle 110 to operate automatically and/or autonomously. The control system 210 can store an electronic map that represents the environment of the self-driving industrial vehicle 110, such as a facility, in the memory 214.

According to some embodiments, the communication interface 216 can be a wireless transceiver for communicating with a wireless communications network (e.g. using an IEEE 802.11 protocol, a 3G/4G protocol, or similar).

One or more sensors 220 may be included in the self-driving industrial vehicle 110 to obtain data about the environment of the self-driving industrial vehicle 110. These sensors 220 may be referred to as "perception sensors" or "navigation sensors" in order to distinguish them from other internal sensors 236. For example, according to some embodiments, the sensor 220 may be a LiDAR device (or other optical, sonar, or radar-based range-finding devices operating on various principles as known to those skilled in the art). The sensor 220 may be optical sensors, such as video cameras and systems (e.g., stereo vision, structured light).

According to some embodiments, the self-driving industrial vehicle 110 may receive a mission from a fleet-management system 120 or other external computer system in communication with the self-driving industrial vehicle 110 (e.g. in communication via the communication interface 216). In this case, the mission contains one or more waypoints or destination locations. Based on the waypoint or destination location contained in the mission, the self-driving industrial vehicle 110, based on the control system 210, can autonomously navigate to the waypoint or destination location without receiving any other instructions from an external system. For example, the control system 210, along with the sensors 220, enable the self-driving industrial vehicle 110 to navigate without any additional navigational aids such as navigational targets, magnetic strips, or paint/tape traces installed in the environment in order to guide the self-driving industrial vehicle 110.

For example, the control system 210 may plan a path for the self-driving industrial vehicle 110 based on a destination location and the location of the self-driving industrial vehicle 110. Based on the planned path, the control system 210 may control the drive system 230 to direct the self-driving industrial vehicle 110 along the planned path. As the self-driving industrial vehicle 110 is driven along the planned path, the sensors 220 may update the control system 210 with new images of the environment of the self-driving industrial vehicle 100, thereby tracking the progress of the self-driving industrial vehicle 110 along the planned path and updating the location of the self-driving industrial vehicle 110.

Since the control system 210 receives updated images of the environment of the self-driving industrial vehicle 110, and since the control system 210 is able to autonomously plan the self-driving industrial vehicle's path and control the drive system 230, the control system 210 is able to determine when there is an obstacle in the self-driving industrial vehicle's path, plan a new path around the obstacle, and then drive the self-driving industrial vehicle 110 around the obstacle according to the new path.

The self-driving industrial vehicle 110 may also comprise one or more internal sensors 236. These internal sensors general measure and monitor the state of the vehicle 110 itself, as compared to the sensors 220, which sense the vehicle's environment. The internal sensors 236 may be associated with particular components of the vehicle 110. For example, the sensors 236 may be current and/or voltage sensors for measuring the current and/or voltage of a particular electrical component, or for determining an approximate state of battery charge. The sensors 236 may be encoders for measuring the displacement, velocity, and/or acceleration (e.g. angular displacement, angular velocity, angular acceleration) of mechanical components such as motors, wheels, and shafts. The sensors 236 may be thermal sensors for measuring heat, for example, the heat of a motor or brake. The sensors 236 may be inertial measurement units for measuring motion of the body of the vehicle 110 (e.g. the sensors 236 may comprising accelerometers, gyroscopes, etc.). The sensors may be water ingress sensors for detecting water within the body of the vehicle 110.

The sensors 236 may also include other sensors for measuring environmental characteristics, though not as perception or navigation sensors. For example, the sensors 236 may include humidity sensors for measuring the ambient humidity in the facility. Similarly, the sensors 236 may include thermal sensors for measuring the ambient temperature in the facility.

For simplicity and clarity of illustration, the example shown in FIG. 2 shows a single block labelled "internal sensors" 236, which is in communication with both the control system 210 and the drive system 230. In this example, the internal sensors 236 are shown in communication with the drive system 230 in order to measure characteristics of the drive system 230, for example, motor speed, motor temperature, etc.

The internal sensors 236 are generally in communication with the control system 210 so that the control system 210 can received the measurements from the sensors, for example, in order to determine or provide information related to vehicle status. According to some embodiments, there may be any number of internal sensors 232, which may or may not all be in communication with the drive system 230, depending on the nature of the particular internal sensors 236.

The positions of the components 210, 212, 214, 216, 220, 230, and 236 of the self-driving industrial vehicle 110 are shown for illustrative purposes and are not limited to the positions shown. Other configurations of the components 210, 212, 214, 216, 220, 230, and 236 are possible.

Figure 3:
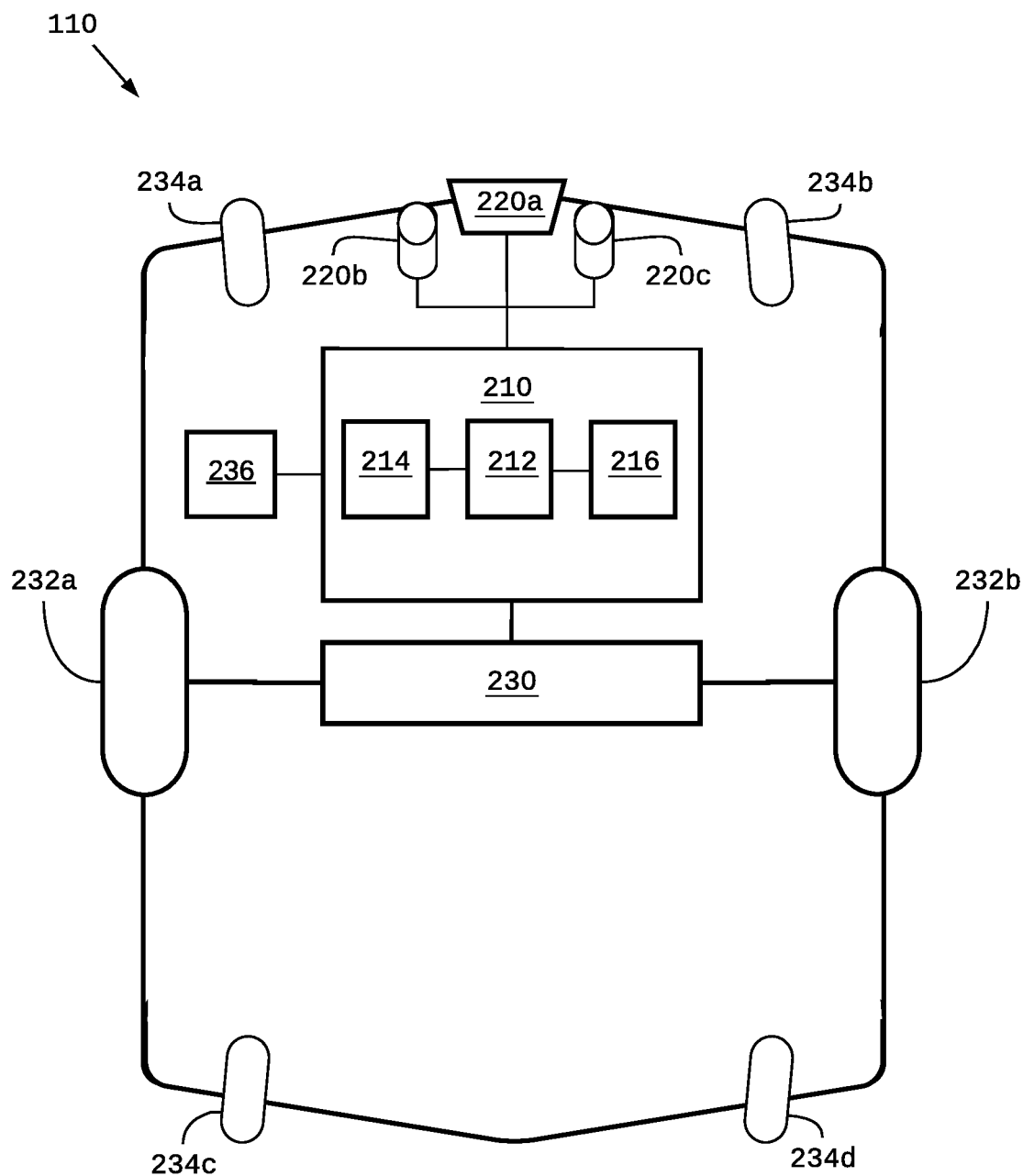
FIG. 3 is a block diagram of the self-driving vehicle shown in FIG. 1, according to at least one embodiment.

Referring to FIG. 3, there is shown a block diagram of a self-driving industrial vehicle 110, according to at least one embodiment. The drive system 230 includes a motor and/or brakes connected to drive wheels 232a and 232b for driving the self-driving industrial vehicle 110. According to some embodiments, the motor may be an electric motor, a combustion engine, or a combination/hybrid thereof. According to some embodiments, there may be one motor per drive wheel, for example, one for drive wheel 232a and one for drive wheel 232b. Depending on the particular embodiment, the drive system 230 may also include control interfaces that can be used for controlling the drive system 230. For example, the drive system 230 may be controlled to drive the drive wheel 232a at a different speed than the drive wheel 232b in order to turn the self-driving industrial vehicle 110. Different embodiments may use different numbers of drive wheels, such as two, three, four, etc.

According to some embodiments, additional wheels 234 may be included (as shown in FIG. 3, the wheels 234a, 234b, 234c, and 234d may be collectively referred to as the wheels 234). Any or all of the additional wheels 234 may be wheels that are capable of allowing the self-driving industrial vehicle 110 to turn, such as castors, omni-directional wheels, and mecanum wheels.

According to some embodiments, the sensors 220 (as shown in FIG. 3, the sensors 220a, 220b, and 220c may be collectively referred to as the sensors 220) may be optical sensors arranged in a manner to provide three-dimensional (e.g. binocular or RGB-D) imaging.

The vehicle 110 may also include one or more internal sensors 236, as previously described in respect of FIG. 2.

The positions of the components 210, 212, 214, 216, 220, 230, 232, 234, and 236 of the self-driving industrial vehicle 110 are shown for illustrative purposes and are not limited to the shown positions. Other configurations of the components 210, 212, 214, 216, 220, 230, 232, 234, and 236 are possible.

Generally, one or more vehicles 110 may comprise a fleet of vehicles that operates within an industrial facility. As the vehicle is operating (or is unable to operate) within the facility, the vehicle may experience one or more states or conditions. These states and conditions can be reflected in a vehicle status.

The vehicle 110 described in FIG. 2 and FIG. 3 is provided as an example and in reference to some embodiments. However, the systems and methods contemplated herein may also be embodied with other types of vehicles. Such vehicles are not limited to being self-driving vehicles, nor to being terrestrial vehicles. For example, vehicles used in indoor and/or outdoor industrial facilities and environments may be used. Vehicles on public roadways may be used. Aerial vehicles, such as autonomous aerial vehicles may be used. Aquatic vehicles such as autonomous or automated boats may be used. According to some embodiments, the vehicles need not be autonomous, or enabled with any particular degree of automation.

Figure 4:
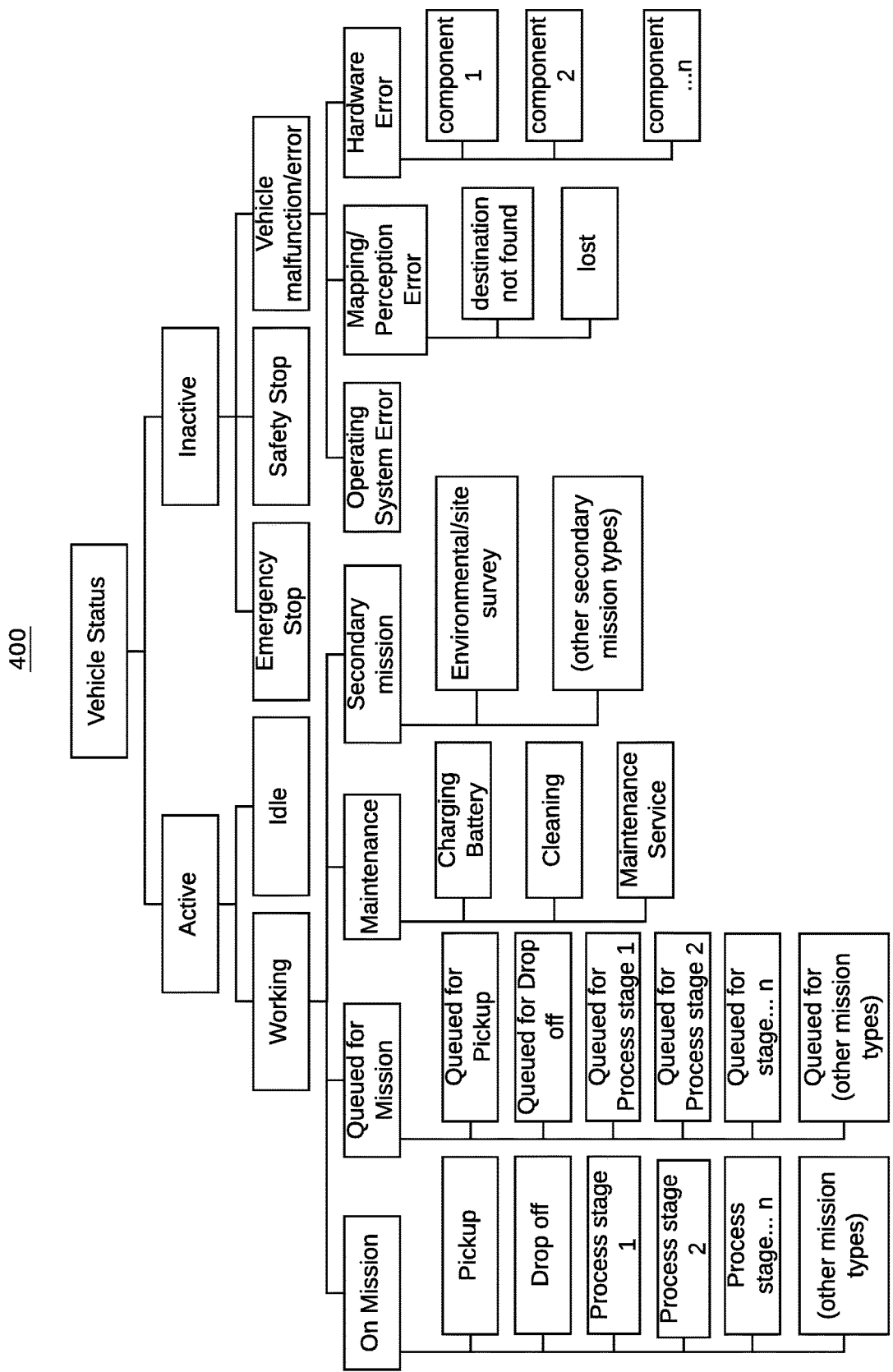
FIG. 4 is a tree diagram showing vehicle statuses and their relationships, according to at least one embodiment.

Referring to FIG. 4, there is a hierarchal tree diagram of vehicle statuses 400 according to some embodiments. The vehicle statuses 400 shown in FIG. 4 provide an example of one set of vehicle statuses, and an example of the relationships between vehicle statuses according to some embodiments.

Each of the vehicle statuses 400 may be stored as a vehicle status, for example, on one or more non-transitory computer-readable media. As explained further below, each vehicle status may be stored in a vehicle status record as a part of a vehicle status log.

In the example shown in FIG. 4, each vehicle status 400 may be described as "active" or "inactive". According to some embodiments, the vehicle statuses "active" and "inactive" may be mutually-exclusive, and may be used to indicate generally when a vehicle is operating as intended ("active") as opposed to not operating as expected ("inactive").

For example, and as indicated by the vehicle statuses 400, the "active" vehicle status may include both a "working" status and an "idle" status. In this case, "working" means that the vehicle is operating as expected ("active") and is currently executing a task or operation. "Idle", conversely, means that the vehicle is operating as expected, but is not currently executing a task or operation.

The vehicle status "working" may include, for example, such vehicle statuses as "on mission", "queued for mission", "maintenance", and "secondary mission". The statuses "on mission" and "queued for mission" are similar in that both pertain to the execution of various missions; but differ in that "on mission" pertains to the present execution of a particular mission, whereas "queued for mission" indicates that a vehicle has been assigned a particular mission, and is waiting for a subsequent condition (such as the execution of another mission by another vehicle or the completion of a precedent process stage) before executing the mission.

As further described below, this distinction between "on mission" and "queued for mission" may be useful, for example, in the generation of a report used to analyze the efficiency of a particular process.

As shown by way of various examples in FIG. 4, both the "on mission" and "queued for mission" statuses can include vehicle statuses named for, or associated with, particular mission types. For example, "pickup" may be a mission status that is included within the "on mission" status. Similarly, "queued for pickup" may be a mission status that is included within the "queued for mission" status.

The example mission statutes shown in FIG. 4 are provided for descriptive purposes. According to some embodiments, any particular set of mission types may be included as a status under "on mission" and/or "queued for mission". In some cases, the type of mission may be generic, such as "pick up" and "drop off", whereas in some cases the type of mission may be specific to a particular process. According to some embodiments, "working" may pertain to tasks and operations associated with the primary purpose for which the vehicles are used, such as material transport or assembly.

The "maintenance" vehicle status, which is included as a "working" status in the example of FIG. 4, indicates that the vehicle is operating as expected ("active") and is currently executing a task or operation, but not a task or operation associated with a "mission", such as a task or operation associated with the primary purpose for which the vehicles are used. According to some embodiments, the "maintenance" vehicle status may include vehicle statuses associated with tasks and operations that are necessary and/or beneficial for the other "working" statuses. For example, the "maintenance" statuses may include "charging battery", "cleaning", and "maintenance service". In other words, according to some embodiments, when a vehicle is charging its battery, or being cleaned, or undergoing preventative maintenance services, it may be considered "working" even though it is not on a mission or queued for a mission.

According to some embodiments, vehicles may also be sent on secondary missions. As such, the "working" vehicle status may include the "secondary mission" vehicle status. Secondary missions are tasks and operations that can be performed by vehicles that are not otherwise on a mission, queued for a mission, or on maintenance. For example, secondary missions may include environmental or site survey missions conducted by vehicles, such as mapping or remapping parts of the facility that are unknown or known by outdated maps. Other example of secondary missions include surveying WiFi signal strength within the facility, perform security surveys by detecting unexpected behaviors within the facility (e.g. the unexpected presence of a human), transporting discarded trash, cleaning the facility (e.g. sweeping floors), and detecting conditions unsafe for human operators within the facility.

According to some embodiments, missions and secondary missions may be conducted concurrently. For example, a vehicle might conduct a secondary mission of mapping or remapping the facility while also conducting a pickup mission. Such concurrent missions and secondary missions may be reflected by a hybrid vehicle status (not shown in FIG. 4) that indicates the mission and secondary mission, or by simultaneously recording a "mission" vehicle status and a "secondary mission" vehicle status.

The "idle" vehicle status indicates that the vehicle is in an "active" status, but not a "working" status. In other words, when a vehicle is idle, it is operating as expected, but is not executing any particular task or operation.

Referring back to the top-level vehicle statuses 400, the "inactive" vehicle status may include such statuses as an "emergency stop" status, a "safety stop" status, and a "vehicle malfunction/error" status. The "inactive" statuses mean that the vehicle is not operating as expected.

For example, the "emergency stop" status may result from the actions of a human operator who perceives or experiences a potential emergency situation. For example, a vehicle may include an emergency button or switch that can be activated in order to induce an emergency stop. According to some embodiments, the vehicle may only return to normal operation after further human action, such as by subsequently pushing the emergency stop button again.

The "safety stop" status may also be included as an "inactive" status. According to some embodiments, a vehicle may use its sensors (e.g. LiDAR, vision) in order to establish a safety field relative to the vehicle. A safety stop may be induced as the result of sensing an object within the safety field. For example, if a human operator enters the safety field while the vehicle is moving, the vehicle may stop moving as a result of the safety stop. When the human operator leaves the safety field, the vehicle may resume its motion.

The "inactive" status may also include the "vehicle malfunction/error" status. Generally, the "vehicle malfunction/error" status may indicate hardware, software, or other system errors or malfunctions. For example, the "vehicle malfunction/error" status may include the "operating system error" status, "mapping/perception error" status, and "hardware error" status.

The "mapping/perception error" status may include a "destination not found" status that pertains to a situation in which the vehicle is at a known location relative to the map, but does not perceive an object as expected based on the map (or conversely perceives an object not expected based on the map). The "mapping/perception error" status may also include a "lost" status that pertains to a situation in which the vehicle is unable to determine its location relative to the map.

The "hardware error" status may include statuses that pertain to any components and/or subsystems of the vehicle. While the label "hardware error" is used, such errors may include errors in the software or firmware on which the components or subsystems rely. In other words, the "hardware error" status may include statuses that indicate the particular reason why a more general problem is observed. Such components and subsystems may include motors, brakes, steering systems, battery and energy systems, communications systems, sensors, controllers, and computers, and any components or subsystems thereof. These components and subsystems are generally referred to as "component 1", "component 2", . . . "component n". Though not shown in FIG. 4, any or all of the components 1-n may also include its own statuses.

By organizing the vehicle statuses 400 into a hierarchal tree, various levels of detail and information may be made available as appropriate or relevant. For example, in respect of an "active" vehicle status, the lowest-level status may be "pickup". As such, this status can be used to indicate, specifically, that the vehicle was executing a pickup mission, generally, that the vehicle was "active", or anything in between (e.g. "working" and "on mission"). Similarly, in respect of an "inactive" vehicle status, the lowest-level status may be "motor overheating". As such, this status can be used to indicate that one of the vehicle's motors was overheating, generally, that the vehicle was "inactive", or anything in between (e.g. "motor error", "hardware error", "vehicle malfunction/error").

Figure 5:
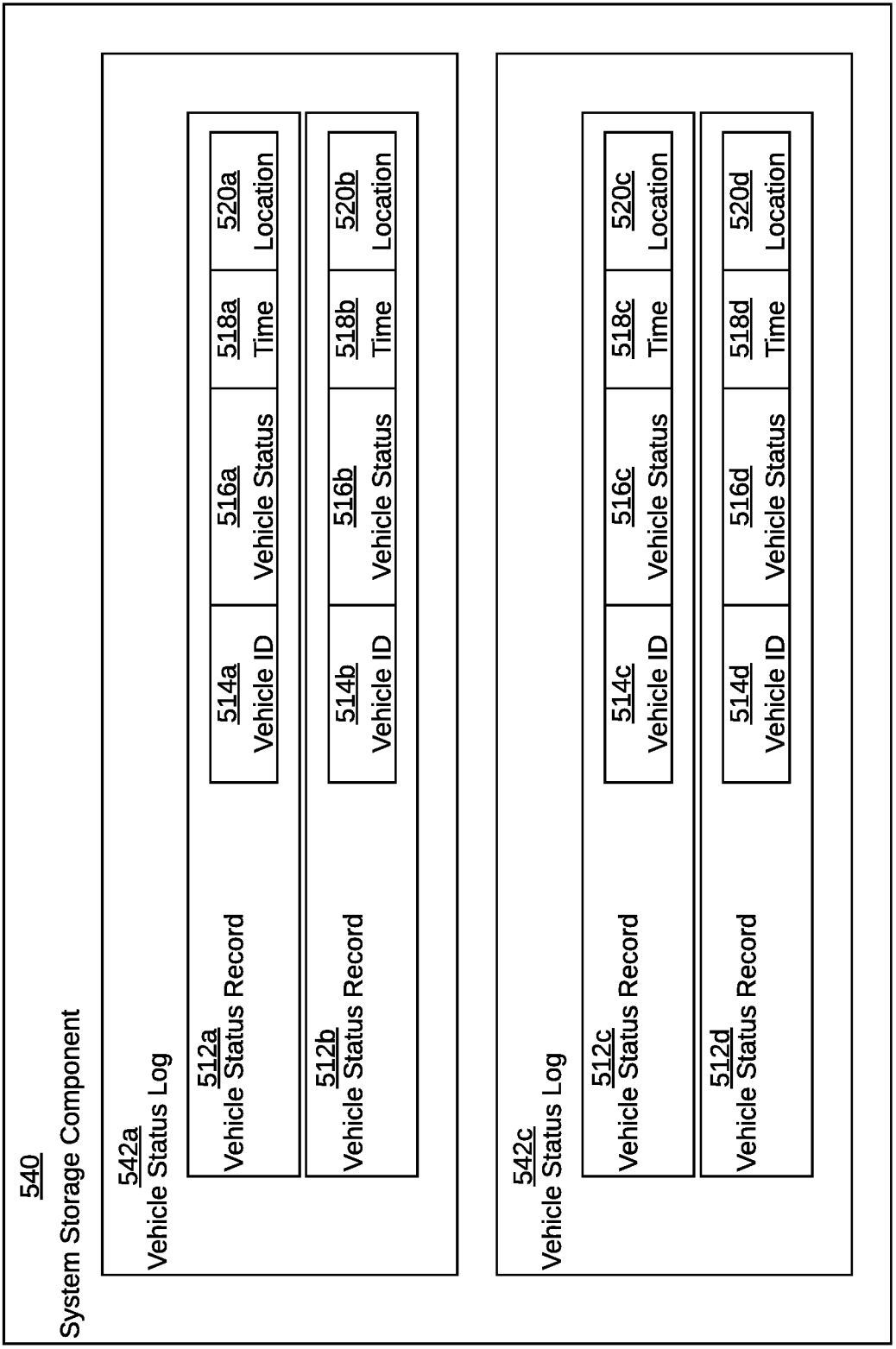
FIG. 5 is a block diagram of a system storage component according to at least one embodiments.

Each of these vehicle statuses 400 may be recorded, for example, on non-transitory computer-readable media, as further described in reference to FIG. 5.

Referring to FIG. 5, there is shown a block diagram for a system storage component 540 storing vehicle status logs 542a and 542b (generally referred to as vehicle status log(s) 542). One or more vehicle status logs 542 are stored on one or more system storage components 540. According to some embodiments, the vehicle status log 542a may pertain to a first fleet of vehicles associated with a first organization (e.g. operator of an industrial facility), and the vehicle status log 542b may pertain to a second fleet of vehicles associated with a second organization such that the vehicle status log 542a is isolated from the vehicle status log 542b. According to some embodiments, all of the vehicle status logs stored on the system storage component 540 may be associated with the same organization.

Each vehicle status log 510 comprises one or more vehicle status records 512. In the example of FIG. 5, vehicle status log 510a includes vehicle status records 512a and 512b, and vehicle status log 510c includes vehicle status records 512c and 512d.

For the sake of simplicity and clarity of illustration, FIG. 5 provides an example in which two vehicle status logs are stored on a system storage component, and each vehicle status log has two vehicle status records. However, at any particular time, a vehicle status log may comprise any number of vehicle status records.

The vehicle status record 512a may comprise any or all of a vehicle ID 514a, a vehicle status 516a, a time stamp 518a, and a location 520a.

According to some embodiments, a vehicle ID 542a may be included in the vehicle status record 512a. According to some embodiments, the vehicle status log 542a may pertain to a fleet of vehicles having more than one vehicle. In such a case, the vehicle ID 514a may be used to uniquely identify a particular vehicle within the fleet to which the particular vehicle status record 512a pertains.

The vehicle ID 514a may be provided or determined in various ways. According to some embodiments, the vehicle ID 514a may be determined based on information transmitted by the vehicle as a part of a status update, such as a vehicle name, a vehicle serial number, the vehicle ID 514a itself, or other uniquely identifying information pertaining to the vehicle. According to some embodiments, a fleet-management system or server receiving a status update from the vehicle may be able to determine uniquely identifying information based on communications with the vehicle. For example, the fleet-management system or server may understand a network address (e.g. IP address) unique to the vehicle, and may use this information to generate the vehicle ID 514a.

The vehicle status record 512a may also include a vehicle status 516a. The vehicle status 516a may be transmitted by the vehicle as part of a status update, and/or the vehicle status 516a may be determined by the fleet-management system or server based on information received in a vehicle update. According to some embodiments, the vehicle status 516a pertains to the vehicle statuses 400 described in respect of FIG. 4. According to some embodiments, the available values for the vehicle status 516a may be organized as a hierarchy as shown in FIG. 4. According to some embodiments, the vehicle statuses may not be organized in a hierarchy, and may be a set of independent statuses.

According to some embodiments, more than one vehicle status 516a may be included within a single vehicle status record 512a. For example, it may be desirable to record two or more vehicle statuses in order to record two or more conditions that are simultaneously being experienced by the vehicle. As non-limiting examples, the vehicle may simultaneously be executing a primary mission (e.g. "pickup") and a secondary mission (e.g. "environmental/site survey"). According to some embodiments, the vehicle may simultaneously be on a mission (e.g. "process stage 1") and experiencing a hardware error (e.g. "component 1 malfunction").

According to some embodiments, the vehicle status 516a may indicate a binary state pertaining to a status. For example, the vehicle status "drop off" may be a discrete indication that the vehicle is executing a drop-off mission. Similarly, a vehicle status "component 2 error" may be a discrete indication that an error is experience at component 2 (e.g. without giving any further indication as to the details of the error).

According to some embodiments, the vehicle status 516a may indicate a value associated with the particular condition of a status. For example, if "component 2" is a thermal sensor on one of the vehicle's motors, then the vehicle status 516a may indicate the particular temperature measured by the thermal sensor.

According to some embodiments, each vehicle status record 512a may include a unique vehicle status 516a for each system component (e.g. hardware and/or software component) of the vehicle. In such a case, each time a vehicle status record 512a is recorded in the vehicle status log 542a, the vehicle status record 512a may reflect a "snap shot" of the state of the vehicle in its entirety. According to some embodiments, a single vehicle status 516a may comprise a status word that represents the "snap shot" of the state of the vehicle in its entirety within a single data structure.

The vehicle status record 512a may also include a time stamp 518a. The time stamp 518a may be transmitted by the vehicle as part of a status update, and/or the time stamp 518a may be determined by the fleet-management system or server based on information received in a vehicle update. Generally, the time stamp 518a is associated with the time (or approximate time) corresponding to the vehicle status 516a.

The vehicle status record 512a may also include a location 520a. The location 520a may be transmitted by the vehicle as part of a status update, and/or the location 520a may be determined by the fleet-management system or server based on the last-known location of the vehicle according to the fleet-management system. Generally, the location 520a is associated with the location (or approximate location) relative to the vehicle's electronic map of the facility, corresponding to the vehicle status 516a.

Generally, the vehicle status logs #142 stored on the system storage component 540 may be used to generate reports pertaining to the performance and/or status of a single vehicle or a fleet of vehicles.

Figure 6:
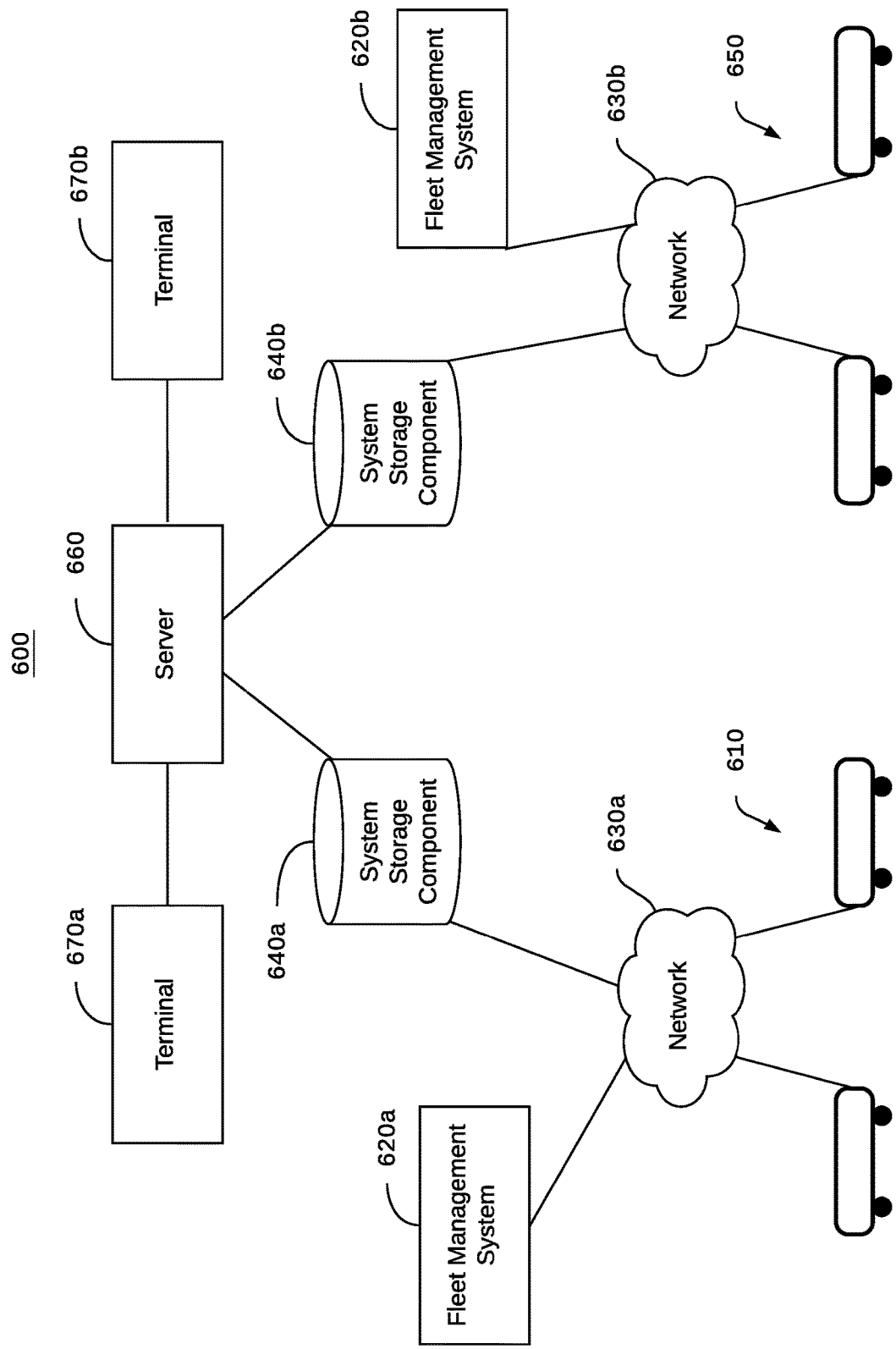
FIG. 6 is a system diagram of a system for maintaining vehicle state information, according to at least one embodiment.

Referring to FIG. 6, there is shown a system 600 of a first fleet of self-driving industrial vehicles 610, and a second fleet of self-driving industrial vehicles 650 according to at least one embodiment. For simplicity and clarity of illustration, the example of the system 600 shown in FIG. 6 includes two fleets 610 and 650. According to some embodiments, any number of fleets can be used.

The system can include a first network 630a associated with the first fleet 610, and a second network 630b associated with the second fleet 650.

A first fleet-management system 620a is in communication with the first network 630a for managing the first fleet 610, and a second fleet-management system 620b is in communication with the second network 630b for managing the second fleet 650.

A first system storage component 640a is in communication with the first network #30a for storing vehicle status logs pertaining to the vehicles in the first fleet 610. A second system storage component 640b is in communication with the second network 630b for storing vehicle status logs pertaining to the vehicles in the second fleet 650.

The system storage components 640a and 640b are in communication with a server 660. A first terminal 670a and a second terminal 670b are also in communication with the server 660. According to some embodiments, any or all of the terminal 670a, the fleet-management system 620a, and the system storage component 640a may be implemented using the same computer hardware system. Similarly, any or all of the terminal 670a, the fleet-management system 620b, and the system storage component 640b may be implemented using the same computer hardware system. For example, one computer could implement a fleet-management system, and another could implement the terminal and system storage component. Or, one computer could implement a fleet-management system and system storage component, and another could implement the terminal; etc.

The terminal 670a may be used to request reports pertaining to the fleet 610 from the server 660, and the terminal 670a may be used to request reports pertaining to the fleet 650. According to some embodiments, digital protection measures, such as firewalls and other network-traffic controls, or user-based authorizations may be used to prevent the terminal 670a from accessing the system storage component 640b. In this way, data security is enabled such that users from a first organization (e.g. using the terminal 670a) cannot access data pertaining to the fleet of a second organization (e.g. the fleet 650) and vice-versa.

In use, the first fleet-management system 620a dispatches missions to the first fleet 610. As the vehicles in the fleet 610 are operating (or failing to operate), vehicle status logs are compiled in the first system storage component 640a, for example, by recording vehicle status records. The first terminal 670a can then be used to request reports from the server 660, which then generates reports on vehicle status, fleet status, vehicle performance, and fleet performance based on the vehicle status logs in the first system storage component 640a. The second fleet 650, the second fleet-management system 620b, the second system storage component 640b, and the second terminal 670b may be operated in a respective manner.

According to some embodiments, the first fleet 610, first fleet-management system 620a, first network 630a, first system storage component 640a, and first terminal 670a may be located at a first location, for example, a first industrial facility. The second fleet 650, the second fleet-management system 620b, second network 630b, second system storage component 640b, and second terminal 670b may be located at a second location, for example, a second industrial facility. The server 660 may be located at a third location, for example, a service-provider facility.

According to some embodiments, a stand-alone system may be operated at a single site, for example, using only one fleet 610 (and not fleet 650), one fleet-management system 620a, one network 630a, one system storage component 640a, and a server 660 located at one location. In such a case, the terminal 670a and server 660 may be implemented on a single computer system.

Figure 7:
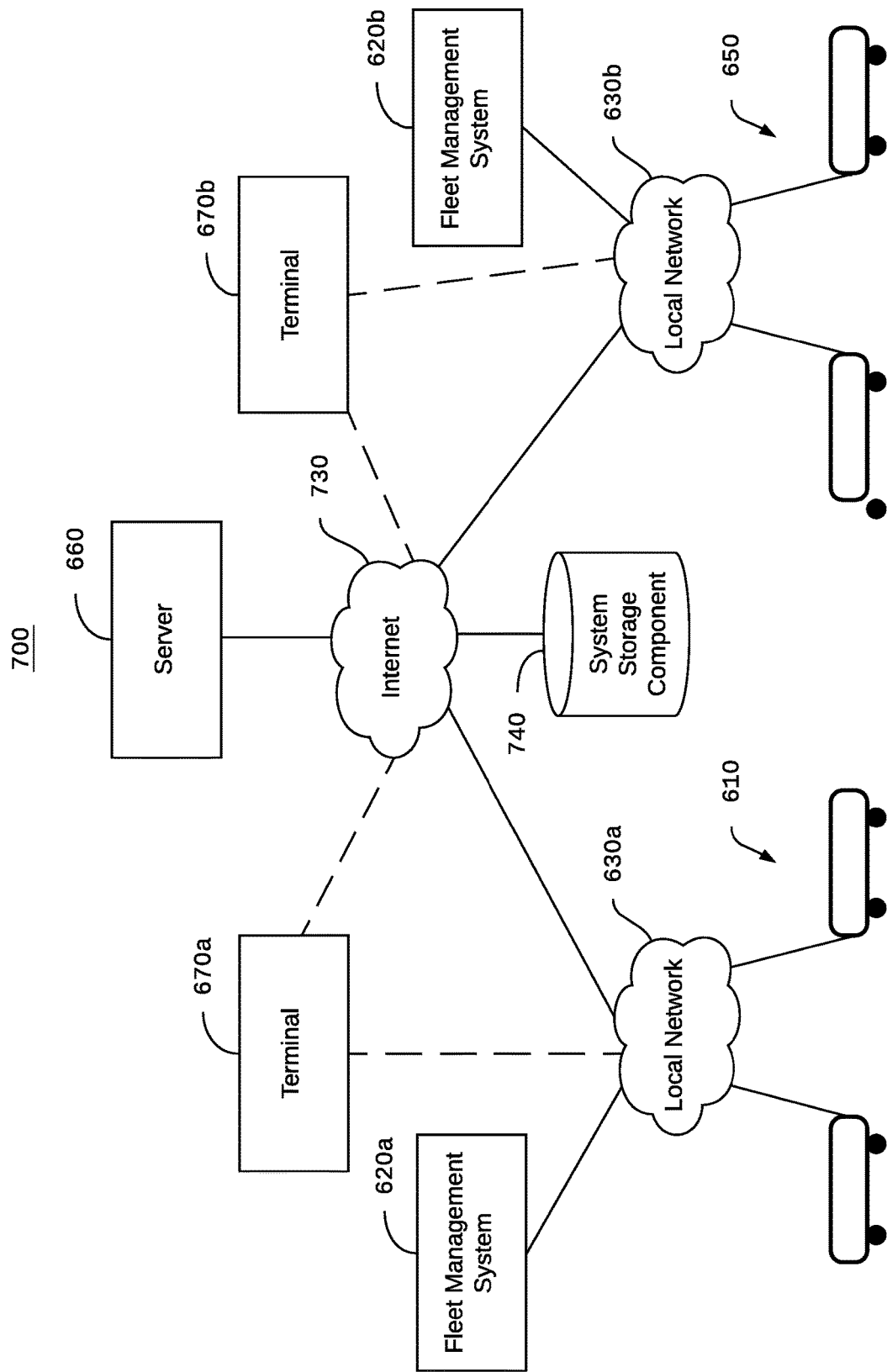
FIG. 7 is a system diagram of a system for maintaining vehicle state information, according to at least one embodiment.

Various network topologies and communications structures are possible. Another such possibility is shown in the example of the FIG. 7. Referring to FIG. 7, there is shown a system 700 of a first fleet of self-driving industrial vehicles 610, and a second fleet of self-driving industrial vehicles 650 according to at least one embodiment. For simplicity and clarity of illustration, the example of the system 600 shown in FIG. 6 includes two fleets 610 and 650. According to some embodiments, any number of fleets can be used.

The system 700 differs from the system 600 shown in FIG. 6 in that only one system storage component 740 is used. According to some embodiments, vehicle status logs pertaining to the first fleet 610 and vehicle status logs pertaining to the second fleet 650 may be stored on the same system storage component 740. For example, the system storage component 740 may be located at a service-provider location along with the server 660.

According to some embodiments, the first fleet 610, first fleet-management system 620a, first network 630a, and the first terminal 670a may be located at a first location, for example, a first industrial facility. The second fleet 650, the second fleet-management system 620b, second network 630b, and second terminal 670b may be located at a second location, for example, a second industrial facility. The system storage component 740 and the server 660 may be located at a third location, for example, a service-provider facility. According to some embodiments, the system storage component 740 may be a part of, or implemented on the same computer system as the server 660.

According to some embodiments, the equipment at the three locations may be in communication using the Internet 730. The first terminal 670a may be in communication with the local network 630a and/or the Internet 730, and the second terminal 670b may be in communication with the local network 630b and/or the Internet 730. As such, a terminal may be located anywhere, including but not limited to an industrial facility location, a service-provider location, or elsewhere. As previously described, digital protection measures may be used in order to prevent access of vehicle status logs pertaining to the first fleet 610 from the second terminal 670b, and to prevent access of vehicle status logs pertaining to the second fleet 650 from the first terminal 670a.

Figure 8:
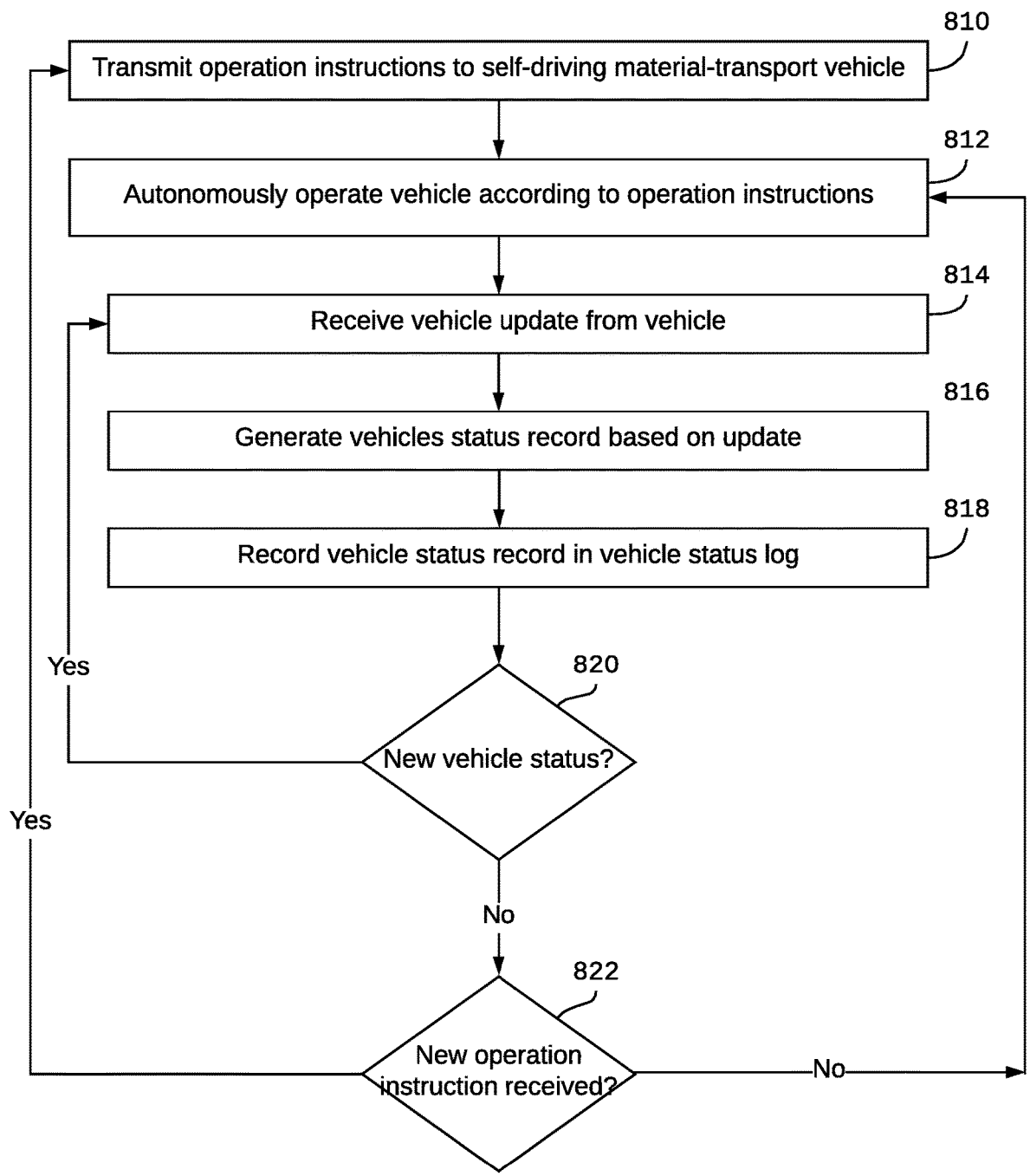
FIG. 8 is a flow diagram depicting a method for maintaining vehicle state information, according to at least one embodiment.

Referring to FIG. 8, there is a method 800 for monitoring a fleet of self-driving vehicles. According to some embodiments, all or parts of the method 800 may be executed by a server such as the server 660 or by a fleet-management system such as the fleet-management system 120. According to some embodiments, all or parts of the method 800 may be executed using a system storage component such as the system storage component 140, and one or more vehicles such as the fleet of vehicles 110.

The method 800 begins at step 810 when operation instructions are transmitted to a self-driving industrial vehicle. According to some embodiments, the operation instructions may be transmitted by a fleet-management system. According to some embodiments, the operation instructions may comprise locations and tasks associated with locations such that a self-driving vehicle may use the operation instructions in order to know which locations it should move to, and what it should do when it arrives at the location. According to some embodiments, the operation instructions do not include specific navigational instructions (other than the locations previously described), since navigation to the locations may be performed autonomously be the vehicle receiving the operation instructions.

At step 812, a vehicle that received the operation instructions that were transmitted at step 810 autonomously operates according to the operation instructions. According to some embodiments, this includes autonomous path-planning, and autonomously controlling the vehicle as it moves along its planned path. For example, the vehicle may drive to a location associated with the operation instructions, and/or perform a task at the location.

A vehicle may transmit status updates based on its operation. Generally, the status updates contain some or all of the information for a vehicle status record. According to some embodiments, the vehicles may transmit status updates according to a predetermined schedule. According to some embodiments, the vehicles may transmit status updates in response to an arbitrary event, such as whenever a change in status is experienced. For example, if the vehicle transmits a status update according to a predetermined schedule, it may transmit at an update interval, such as every second, or every minute. If the vehicle transmits a status update whenever a change in status is experienced, it may transmit a status update when the status changes from "queued for mission" to "on mission", for example. According to some embodiments, a hybrid of these two update modes (on-schedule and on-change) may be used. For example, a vehicle may transmit a status update according to one pre-determined schedule while in a first status (e.g. transmit every second while "on mission"), and may transmit a status update according to a second schedule while in a second status (e.g. transmit every minute while "on secondary mission") or based on status-changes only (e.g. only transmit a status update when status changes from "working" to "idle" and then again when status changes from "idle" to "working").

At step 814, a vehicle update is received from the vehicle. The vehicle update includes at least one of a vehicle status and the vehicle's location as of (or around) the time associated with the update. According to some embodiments, the vehicle update may also include one or both of a vehicle ID (e.g. information identifying the particular vehicle associated with the status update), and a timestamp associated with the status update. According to some embodiments, it may not be necessary to include any or all of the vehicle ID, timestamp, and location in the vehicle update since these may be otherwise determined and included in a vehicle status record.

At step 816, a vehicle status record is generated based on the update. According to some embodiments, the vehicle status record may be generated by the vehicle itself. According to some embodiments, the vehicle status record may be generated by a fleet-management system or other system or server in communication with the vehicle.

As previously described in reference to FIG. 5, a vehicle status record may comprise any or all of a vehicle ID, a vehicle status, a vehicle location, and a timestamp. Any or all of this information may be provided in a status update.

In the case of a vehicle generating a vehicle status record, steps 814 and step 816 can be considered as a single step. In this case, the vehicle itself may generate the vehicle status record (e.g. per step 816), and may transmit this vehicle status record as the vehicle update to the fleet-management system or a server in step 814.

In other cases, the vehicle may transmit a vehicle update to the fleet-management system or server that comprises information that the fleet-management system or server will use to generate the vehicle status record. For example, when one vehicle in a fleet of vehicles sends a vehicle update comprising the vehicle status, the fleet-management system or server may determine the vehicle ID based on its communication with the vehicle, and may then use this vehicle ID within the vehicle status record. Similarly, the fleet-management system may already know the location of the vehicle at the time of the update, and may then use this location within the vehicle status record. The fleet-management system or server may also assign a timestamp to the update, and use this timestamp within the vehicle status record.

At step 818, the vehicle status record is stored in a vehicle status log. Generally, the vehicle status log is stored in a system storage component such as the system storage components 140, 540, 640*a*, 640*b*, and 740. According to some embodiments, for example, when the vehicle status record is generated by the vehicle, the vehicle may communicate with system storage component and store the vehicle status record directly on the system storage component.

According to some embodiments, for example, when the vehicle status record is generated by the fleet-management system or server, the fleet-management system or server may communicate with the system storage component and store the vehicle status record on the system storage component.

As previously described, vehicle updates may be received according to a pre-determined schedule, and/or according to other events such as a change in status. Similarly, vehicle status records may be recorded in the vehicle status log according to a pre-determined schedule and/or according to other events, for example, in association with the reception of a vehicle update.

According to some embodiments, any of steps 812, 814, or 816 may include verifying whether a vehicle update, vehicle status, or vehicle status record contains the same status as the update, status, or status record immediately prior. According to some embodiments, only those updates and statuses representing a change may be kept.

The case of receiving a vehicle update and storing a vehicle status record in association with a new vehicle status is represented by the step 820. If a new vehicle status is experienced (i.e. a change in vehicle status) at step 820, then a vehicle update associated with the new status is received at step 814. Otherwise, if no new vehicle status is experienced (i.e. current status is maintained) at step 820, then the vehicle continues to operate autonomously at step 812.

At step 822, a fleet-management system may receive new operation instructions for a vehicle. For example, new operation instructions could be received from a human operator or other system in communication with the fleet-management system. In the event that new operation instructions are received, the method returns to step 810, and fleet-management system transmits the new operation instructions to the vehicle. Otherwise, the vehicle continues to operate autonomously at step 812.

Figure 9:
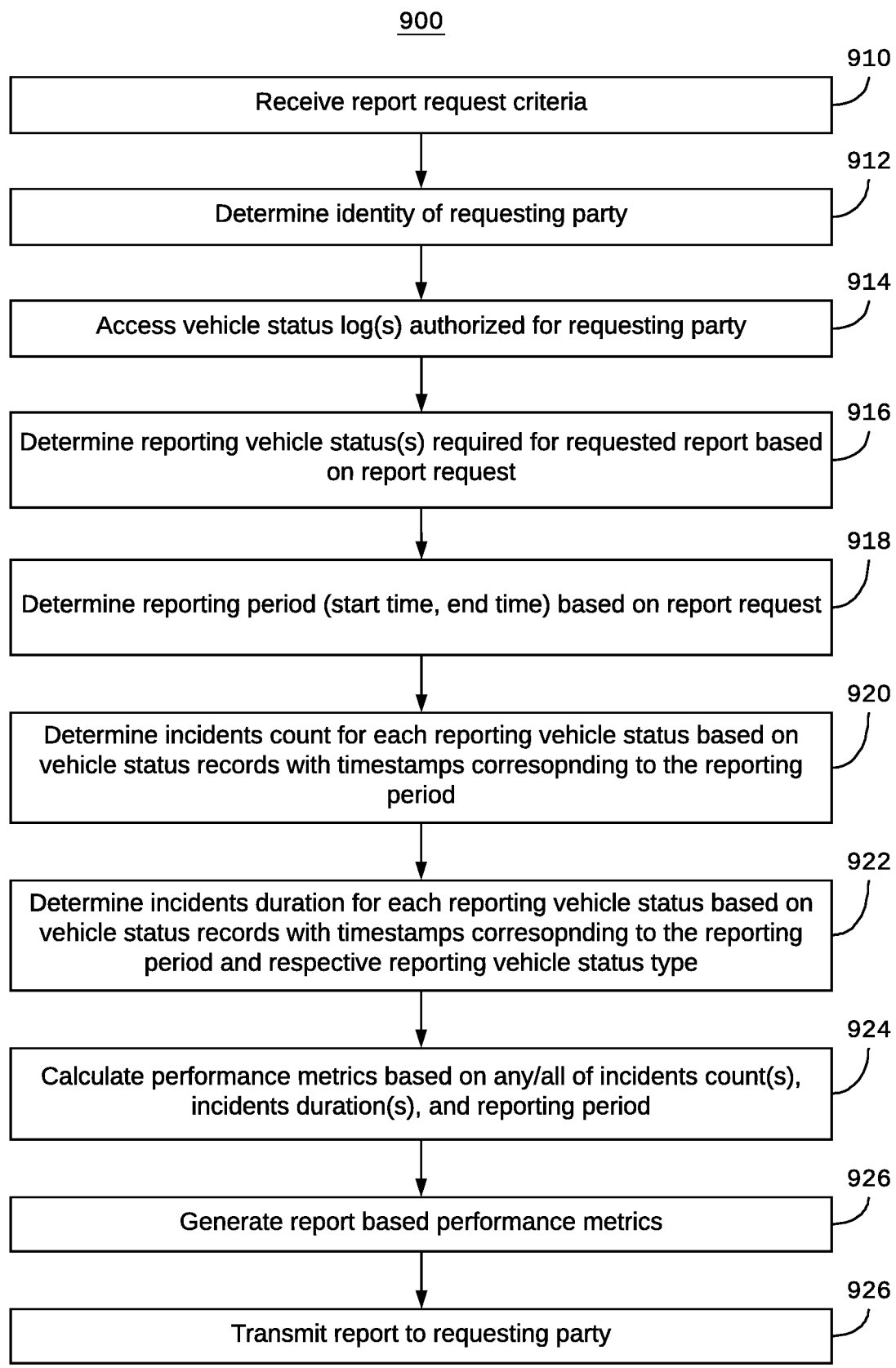
FIG. 9 is a flow diagram depicting a method for maintaining vehicle state information, according to at least one embodiment.

Referring to FIG. 9, there is a method 900 for monitoring a fleet of self-driving vehicles. According to some embodiments, all or parts of the method 900 may be executed by a server such as the server 660 or by a fleet-management system such as the fleet-management system 120. According to some embodiments, all or parts of the method 900 may be executed using a system storage component such as the system storage component 140, and one or more vehicles such as the fleet of vehicles 110. According to some embodiments, the method 900, or its constituent steps, may be executed along with or as a part of the method 800 or its constituent steps.

The method 900 begins at step 910 when report request criteria are received. According to some embodiments, the report request criteria may be received by a server such as the server 660 from a terminal, such as the terminal 670*a* and/or 670*b*. According to some embodiments, the report request criteria may be received by a server such as the server 160 directly from a human operator.

Various types of reports are contemplated. For example, in order to improve the operation of the vehicles within the fleet—that is, to increase the active fleet time by reducing the inactive fleet time—a report may be requested to identify the most common types of vehicle malfunctions/errors. In order to improve the efficiency of human operators working with the fleet, a report may be requested to identify the incidence and average durations of safety stops.

Other reports may be requested in order to understand the performance and utility of the fleet. For example, a report may be requested that compares the active time of the fleet to the inactive time of the fleet, or the working time of the fleet to the idle time of the fleet. Furthermore, a report may be requested that provides an understanding of the mean time taken to execute an industrial process, or a set of stages within the process. In order to improto improve the efficiency of a particular industrial process, a report may be requested to identify bottlenecks in the process based on times spent by vehicles queued for particular process-related missions versus times spent by vehicles executing those missions, or to compare the mean times to execute one stage of the process as compared to other stages of the process.

A report is received from a requesting party, and is generally associated with the identity of the requesting party. According to some embodiments, the identity of the requesting party may be implicit, for example, if the requesting party is the only party using (or authorized to use) the network that includes the system storage component. According to some embodiments, the identity of the requesting party may be associated with or determined based on the report request, for example, based on the network address from which the report request was sent, or based on a user account associated with the report request.

According to some embodiments, step 912 may be used to determine the identity of the requesting party. For example, the identity of the requesting party may be determined based on the network address or user account from which the report request was made. Subsequently, at step 914, vehicle status log(s) for which the requesting party is authorized may be obtained from the system storage component. As such, the vehicle status logs from more than one party may be stored on one or more system storage components on the same network, without one party's vehicle status logs being accessible by another party.

At step 916, one or more reporting vehicle statuses that are required for the requested report are determined based on the report request. For example, if a report on the overall fleet availability has been requested, then the relevant reporting vehicle statuses may be "active" and "inactive". If a report on the mean time before failure of a particular vehicle component has been requested, then the relevant reporting vehicle statuses may pertain to the particular vehicle component.

At step 918, a reporting period is determined based on the report request. In some cases, a start time and an end time, defining the reporting period, may be determined. For example, if a report on the utilization of different industrial process stages for a particular month has been requested, then the reporting period is determined to be the particular month. Generally, a reporting period will always be determined, even if the requested report is based on the entire history of the fleet, from its original installation to the time at which the report was requested.

At step 920, the vehicle status records in the vehicle status log(s) are searched in order to determine an incidents count for each reporting vehicle status. An incidents count is a count of the number of incidents of the reporting vehicle statuses that have occurred during the reporting period. For example, if a report on the number of vehicle malfunctions/errors over a specified period of time has been requested, then the incidents count is the number of vehicle status records indicating unique vehicle malfunctions/errors within the reporting period. According to some embodiments, the incidents count may be represented as an average incidents count per vehicle in the fleet. According to some embodiments, the incidents count may be represented as an aggregate incidents count for all vehicles in the fleet. According to some embodiments, the incidents count may be represented as an average incident count per vehicle in the fleet per standard distance traveled. According to some embodiments, the incidents count may be represented as an average incident count per vehicle in the fleet per standard time elapsed.

At step 922, the incidents duration for each reporting vehicle status is determined. An incidents duration is the duration (e.g. elapsed time) for which the reporting vehicle status occurred during the reporting period. For example, if a report on fleet idle time has been requested, then the incidents duration is the total time that the vehicles in the fleet had an "idle" vehicle status. According to some embodiments, the incidents duration may be represented as an average time per vehicle in the fleet. According to some embodiments, the incidents duration may be represented as an aggregate time for all vehicles in the fleet.

According to some embodiments, each or all of steps 920 and 924 may include parsing a vehicle status hierarchy, such as the vehicle statuses 400 shown in FIG. 4. For example, if the reporting vehicle status is "inactive", then a search of the vehicle status logs may be done to identify all "inactive" vehicle status records, which may involve individual searches for each vehicle status included in the "inactive" vehicle status, such as "emergency stop", "safety stop", "operating system error", "lost", "component 2 failure", etc.

At step 924, reporting metrics may be calculated based on any or all of the incidents count(s), incidents duration(s), and reporting period. In some cases, the performance metric may be an incident count or incident duration itself. For example, the number of mapping errors during a specified time period may be the performance metric. In other cases, other calculations may be performed, such as mean-time calculations, through-put and productivity calculations, process efficiency calculations, and utilization rates.

For example, mean-time calculations may include mean-time between failure, mean-time before interruption, and mean-time before intervention.

As used herein, "mean" may be substituted for "average" and other similar statistical values. As used herein, "before", with respect to mean-time calculations, may be substituted for "between" and "to" as in: mean-time before failure; mean-time between failures; and mean-time to failure. While each word substitution may identify a unique calculation, all such calculations are contemplated here, and the omission of a particular calculation by name does not imply that the particular calculation has not been included here. The terms "mean" and "before" are used for simplicity of description.

For example, a mean-time before intervention ("MTBI") calculation may be calculated as:

$$MTBI = \frac{T_A}{N_I}$$

where $T_A$ is the incidents duration for the "active" vehicle status and $N_I$ is the incidents count for the "inactive" vehicle status.

According to some embodiments, the individual durations of each incident may be determined based on the vehicle status logs, rather than an aggregate incidents duration. For example, the start of each unique "active" and "inactive" period may be determined when the vehicle status changes from "inactive" to "active, and from "active" to "inactive" respectively. In such a case, the MTBI calculation may be expressed as:

$$MTBI = \frac{\Sigma(\text{start of active} - \text{start of inactive})}{N_I}$$

where "start of active" and "start of inactive" indicate the timestamp of the first vehicle status record of the "active" status since the last "inactive" status, and the timestamp of the first vehicle status record of the "inactive" status since the last "active" status, respectively.

According to some embodiments, such mean-time calculations may be normalized for the number of vehicles in the fleet. In such a case, the MTBI calculation may be expressed as:

$$MTBI = \frac{T_A \times n}{N_I}$$

where n is the number of vehicles in the fleet.

Other examples of mean-time calculations include the mean-time before malfunction/error of a vehicle, the mean-time before malfunction/error of a particular component, the mean-time for finishing a process or producing a finished good (e.g. from the start of the first process-stage mission to the completion of the last process-stage mission), the mean-time for vehicles to be queued for missions or for a particular mission, the mean-time lost to mapping/perception errors, the mean-time lost to operating system errors, the mean-time lost to hardware errors, etc.

Examples of mean number calculations other than mean-time calculations include the mean number of missions run per vehicle malfunction/error (or per malfunction/error of a particular component), the mean number of vehicles in the fleet used to produce a finished good, the mean-time spent picking up and dropping off payloads within the facility, etc.

Other reporting metrics may include comparisons and rates of incidents counts of one or more reporting vehicle statuses and/or the reporting period. For example, the incidents count associated with a particular vehicle status can be divided by the reporting period in order to determine an incident rate for the vehicle status; such as the number of safety stops experienced in an hour, or the number of safety stops experienced in during a labor shift at the industrial facility.

Other examples include the number of times a particular mission was run per unit time (e.g. per hour, per shift, etc.), the number of missions run per unit time, the number of complete processes (e.g. execution of the final process stage mission, or the number of finished goods produced) per unit time, the number of emergency stops per unit time, etc.

Further examples using two or more reporting vehicle statuses include the number of safety stops per finished good produced, the number of vehicle malfunctions/errors per finished good produced, the average number of vehicles within maintenance status within the fleet at any time, the number of working vehicles in the fleet per finished good produced.

Similarly, reporting metrics may include comparisons and rates of incidents durations of one or more reporting vehicle statuses and/or the reporting period. For example, the incidents duration associated with a particular vehicle status can be divided by the reporting period in order to determine an incident duty cycle for the vehicle status; such as the percent of time of safety stops experienced in an hour, or the percent of time of safety stops experienced in during a labor shift at the industrial facility.

Other examples include the duration of time that a particular mission was run per unit time (e.g. per hour, per shift, etc.), the duration of time that a "working" vehicle spent queued for missions per unit time, the duration of time that a "working" vehicle spent in maintenance (e.g. charging battery) per unit time, the duration of time lost to safety stops per unit time, the duration of time lost to vehicle malfunction/error per unit time, etc.

Other reporting metrics may include comparisons and rates of incidents counts and incidents durations of one or more reporting vehicle statuses. For example, the number of finished goods produced per vehicle in the fleet per unit time (e.g. per hour, per shift), the number of vehicles per finished good produced, or the utilization rate per vehicle per finished good produced.

At step 926, a report is generated based on the performance metrics. At step 926, the report is transmitted to the requesting party. For example, this may include transmitting the report in digital electronic format from a server such as the server 660 to a terminal such as 670a, if the terminal 670a is associated with the requesting party.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

As used herein, the term "media" generally means "one medium or more than one medium".

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, a wireless device or any other computing device capable of being configured to carry out the methods described herein.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A method for measuring a fleet of self-driving vehicles, comprising:
   transmitting instructions pertaining to an operation to a self-driving vehicle of a first fleet using a first fleet-management system and a self-driving vehicle of a second fleet using a second fleet-management system;
   autonomously operating the vehicles according to the instructions;
   generating vehicle statuses based on the operating of the vehicles;
   recording the vehicle statuses and an associated time as a vehicle status record in a vehicle status log on non-transient computer-readable media;
   receiving a report request for one or more reports from a requesting party at a first terminal; and
   in response to the report request:
      determining an identity of the requesting party; and
      generating a fleet performance report based on the vehicle status log, the fleet performance report comprising one or more vehicle statuses of vehicles of either the first fleet or the second fleet based on an authorization associated with the identity of the requesting party.

2. The method of claim 1, further comprising:
   determining a reporting period based on the report request;
   determining a reporting vehicle status based on the report request; and
   determining an incidents duration based on a set of vehicle status records associated with the reporting vehicle status within the vehicle status log;
   wherein generating the fleet performance report based on the vehicle status log comprises generating the fleet performance report based on the incidents duration.

3. The method of claim 2, further comprising determining an incidents count based on the set of vehicle status records;
   wherein generating the fleet performance report based on the incidents duration comprises generating the fleet performance report based on the incidents duration and the incidents count.

4. The method of claim 1, further comprising:
   determining a second reporting vehicle status based on the report request; and
   determining a second incidents duration based on a second set of vehicle status records associated with the second reporting vehicle status within the vehicle status log;
   wherein generating the fleet performance report based on the vehicle status log comprises generating the fleet performance report based on the incidents duration and the second incidents duration.

5. The method of claim 1, further comprising:
   determining a second reporting vehicle status based on the report request; and
   determining an incidents count based on a second set of vehicle status records associated with the second reporting vehicle status within the vehicle status log;
   wherein generating the fleet performance report based on the vehicle status log comprises generating the fleet performance report based on the incidents duration and the incidents count.

6. A system for measuring a fleet of self-driving vehicles, comprising:
   one or more self-driving vehicles that are members of a first fleet and one or more self-driving vehicles that are members of a second fleet;
   non-transitory computer-readable media in communication with the one or more self-driving vehicles of the first fleet, the one or more self-driving vehicles of the second fleet, a first fleet-management system and a second fleet-management system;
   the first fleet-management system in communication with the one or more self-driving vehicles of the first fleet, the second fleet-management system in communication with the one or more self-driving vehicles of the second fleet, the fleet-management systems configured to store one or more vehicle status records each comprising a vehicle status pertaining to each of the self-driving vehicles and a timestamp in a vehicle status log on the media; and
   a server in communication with the media, the server having a processor configured to:
      receive a report request for one or more reports from a requesting party at a first terminal; and
      in response to the report request, determine an identity of the requesting party and generate a fleet performance report based on the vehicle status log, the fleet performance report comprising one or more vehicle statuses of the self-driving vehicles of either the first fleet or the second fleet based on an authorization associated with the identity of the requesting party.

7. The system of claim 6, wherein the processor configured to generate the fleet performance report comprises the processor configured to:
determine a reporting period based on the report request;
determine a reporting vehicle status based on the report request;
determine an incidents duration based on a set of vehicle status records associated with the reporting vehicle status within the vehicle status log; and
generate the fleet performance report based on the incidents duration.

8. The system of claim 7, wherein the processor configured to generate the fleet performance report further comprises the processor configured to determine an incidents count based on the set of vehicle status records;
wherein the processor configured to generate the fleet performance report based on the incidents duration comprises the processor configured to generate the fleet performance report based on the first incidents duration and the incidents count.

9. The system of claim 7, wherein the processor configured to generate the fleet performance report further comprises the processor configured to:
determine a second reporting vehicle status based on the report request; and
determine an incidents count based on a second set of vehicle status records associated with the second reporting vehicle status within the vehicle status log;
wherein the processor configured to generate the fleet performance report based on the incidents duration comprises the processor configured to generate the fleet performance report based on the incidents duration and the incidents count.

10. The system of claim 9, wherein the reporting vehicle status is an active vehicle status and the second reporting vehicle status is an inactive vehicle status.

11. The system of claim 10, wherein the processor configured to generate the fleet performance report based on the incidents duration and the incidents count comprises a mean-time calculation.

12. The system of claim 7, wherein the processor configured to generate the fleet performance report further comprises the processor configured to:
determine a second reporting vehicle status based on the report request; and
determine a second incidents duration based on a second set of vehicle status records associated with the second reporting vehicle status within the vehicle status log;
wherein the processor configured to generate the fleet performance report based on the incidents duration comprises the processor configured to generate the fleet performance report based on the incidents duration and the second incidents duration.

13. The system of claim 6, wherein the processor configured to generate the fleet performance report comprises the processor configured to:
determine a reporting period based on the report request;
determine a reporting vehicle status based on the report request; and
determine an incidents count based on a set of vehicle status records associated with the reporting vehicle status within the vehicle status log.

14. The system of claim 13, wherein the processor configured to generate the fleet performance report further comprises the processor configured to:
determine a second reporting vehicle status based on the report request; and
determine an incidents duration based on a second set of vehicle status records associated with the second reporting vehicle status within the vehicle status log;
wherein the processor configured to generate the fleet performance report based on the incidents count comprises the processor configured to generate the fleet performance report based on the incidents count and the incidents duration.

15. The system of claim 13, wherein the processor configured to generate the fleet performance report further comprises the processor configured to:
determine a second reporting vehicle status based on the report request; and
determine a second incidents count based on a second set of vehicle status records associated with the second reporting vehicle status within the vehicle status log;
wherein the processor configured to generate the fleet performance report based on the incidents count comprises the processor configured to generate the fleet performance report based on the incidents count and the second incidents count.

16. The system of claim 6, wherein the fleet-management system comprises the server.

17. Non-transitory computer-readable media comprising one or more instructions for measuring a fleet of self-driving vehicles that, when executed on a processor, configure the processor to:
transmit instructions pertaining to an operation of a self-driving vehicle of a first fleet and a self-driving vehicle of a second fleet, the instructions being associated with an autonomous operation of the self-driving vehicles;
record a vehicle status based on the autonomous operation of the vehicles in a vehicle status log;
record a time associated with the vehicle status in the vehicle status log;
receive a report request for one or more reports from a requesting party at a first terminal; and
in response to the report request:
determine an identity of the requesting party; and
generate a fleet performance report based on the vehicle status log, the fleet performance report comprising one or more vehicle statuses of vehicles of either the first fleet or the second fleet based on an authorization associated with the identity of the requesting party.

18. The system of claim 6, wherein the non-transitory computer-readable media comprises a first non-transitory computer-readable media and a second non-transitory computer-readable media, wherein:
the first non-transitory computer-readable media is in communication with the one or more self-driving vehicles of the first fleet, the first fleet-management system and the server;
the second non-transitory computer-readable media is in communication with the one or more self-driving vehicles of the second fleet, the second fleet-management system and the server;
the first fleet-management system is configured to store the one or more vehicle status records in a first vehicle status log on the first non-transitory computer-readable media; and the second fleet-management system is configured to store the one or more vehicle status records in a second vehicle status log on the second non-transitory computer-readable media.

\* \* \* \* \*

UNITED STATES PATENT AND TRADEMARK OFFICE
CERTIFICATE OF CORRECTION

PATENT NO.        : 11,200,760 B2
APPLICATION NO.   : 16/253305
DATED             : December 14, 2021
INVENTOR(S)       : David Andrew Brown et al.

It is certified that error appears in the above-identified patent and that said Letters Patent is hereby corrected as shown below:

In the Specification

Column 17, Lines 18-19:
"within the process. In order to improto improve the efficiency of a particular industrial process, a report may be"
Should read:
-- within the process. In order to improve the efficiency of a particular industrial process, a report may be --

In the Claims

Claim 8, Column 23, Line 24:
"performance report based on the first incidents duration"
Should read:
-- performance report based on the incidents duration --

Signed and Sealed this
Thirteenth Day of February, 2024

Katherine Kelly Vidal
*Director of the United States Patent and Trademark Office*